US008327023B2

(12) United States Patent
Zhao (10) Patent No.: US 8,327,023 B2
(45) Date of Patent: Dec. 4, 2012

(54) QUERIER ELECTION METHOD, ROUTER, AND NETWORK SYSTEM

(75) Inventor: Dahe Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 12/954,741

(22) Filed: Nov. 26, 2010

(65) Prior Publication Data

US 2011/0072158 A1 Mar. 24, 2011

Related U.S. Application Data

(63) Continuation of application No. PCT/CN2009/071946, filed on May 25, 2009.

(30) Foreign Application Priority Data

May 28, 2008 (CN) .......................... 2008 1 0098271

(51) Int. Cl.
*G06F 15/16* (2006.01)
(52) U.S. Cl. ........ 709/245; 709/204; 709/226; 709/228; 709/238; 370/219; 370/252; 370/255; 370/390; 370/400
(58) Field of Classification Search .................. 709/204, 709/226, 228, 238, 245; 370/219, 252, 255, 370/390, 400
See application file for complete search history.

(56) References Cited

U.S. PATENT DOCUMENTS

| 6,721,318 B1 * | 4/2004 | Cai et al. ...................... 370/390 |
| 7,512,146 B1 * | 3/2009 | Sivasankaran et al. ....... 370/432 |
| 2002/0120769 A1 * | 8/2002 | Ammitzboell ................ 709/238 |
| 2002/0122390 A1 * | 9/2002 | Garff et al. ..................... 370/252 |
| 2005/0002397 A1 | 1/2005 | Poulsen et al. |
| 2005/0265230 A1 * | 12/2005 | Na et al. ......................... 370/219 |
| 2006/0062159 A1 * | 3/2006 | Jensen .......................... 370/255 |

FOREIGN PATENT DOCUMENTS

CN 1484406 A 3/2004

OTHER PUBLICATIONS

International Search Report from P.R. China in International Application No. PCT/CN2009/071946 mailed Aug. 27, 2009.
Written Opinion issued by the International Searching Authority from P.R. China on Aug. 27, 2009 in International Application No. PCT/CN2009/071946.
Official Communication issued by European Patent Office on Sep. 13, 2011 in counterpart European Application No. 09753475.4.
R. Vida, "*Multicast Listener Discovery Version 2 (MLDv2) for IPv6*," Request for Comments 3810. Network Working Group. Jun. 2004.
W. Fenner, "*Internet Group Management Protocol, Version 2*," Request for Comments 2236, Network Working Group, Nov. 1997.

* cited by examiner

*Primary Examiner* — Wing F Chan
*Assistant Examiner* — Hitesh Patel
(74) *Attorney, Agent, or Firm* — Leydig, Voit & Mayer, Ltd.

(57) ABSTRACT

A querier election method, a router, and a network system are disclosed. The method includes: a querier starts a sticky-querier-timer; the querier enters the sticky-querier state if the sticky-querier-timer expires; and the querier starts a sticky-query-timer, where the sticky-query-timer is configured to periodically trigger the querier to send a sticky-query message to network devices. With the present invention, the stability of the querier and the network stability can be guaranteed.

13 Claims, 6 Drawing Sheets

FIG. 1a

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     | Max Resp Time |           Checksum            |
+-+-+-+-+-+-+-+-+-+-+-+-+-+-+-+-+-+-+-+-+-+-+-+-+-+-+-+-+-+-+-+-+
|                         Group Address                         |
+-+-+-+-+-+-+-+-+-+-+-+-+-+-+-+-+-+-+-+-+-+-+-+-+-+-+-+-+-+-+-+-+
```

FIG. 5

QUERIER ELECTION METHOD, ROUTER, AND NETWORK SYSTEM

CROSS-REFERENCE TO RELATED APPLICATIONS

This application is a continuation of International Application No. PCT/CN2009/071946, filed on May 25, 2009, which claims priority to Chinese Patent Application No. 200810098271.X, filed on May 28, 2008, both of which are hereby incorporated by reference in their entireties.

FIELD OF THE INVENTION

The present invention relates to the communications field, and in particular, to a querier election method, a router, and a network system.

BACKGROUND OF THE INVENTION

During the planning of an Internet Group Management Protocol (IGMP) network, a device is generally elected to act as a querier; the querier sends a query message to devices in the same multicast group on the IGMP network, and forwards data traffic.

When the devices on the network receive the query message from the querier, the devices compare their own addresses with the address of the querier, and the device with a lower address acts as the current querier. During the research and practice of the prior art, the inventor finds the following problems in the prior art: During the network planning, the network planner generally elects a device with the lowest address to act as the querier; when a new device is added on the network or the address of a device on the network is modified, the new device or the device whose address is modified may become the current querier when receiving a query message if the address of the new device or the device whose address is modified is lower than the address of the current querier. In this case, the current querier on the network may be changed frequently, causing instability of the network.

SUMMARY OF THE INVENTION

Embodiments of the present invention provide a querier election method, a router, and a network system to reduce the change of the querier and ensure the network stability.

A querier election method includes:
starting, by a querier, a sticky-querier-timer;
entering a sticky-querier state if the sticky-querier-timer expires; and
starting a sticky-query-timer, where the sticky-query-timer is configured to periodically trigger the querier to send a sticky-query message to a network device.

A router includes:
a querier electing unit, configured to participate in election of a querier with a network device;
a timing unit, configured to: start the sticky-querier-timer when the querier electing unit wins the election of a querier; enter the sticky-querier state and start a sticky-query-timer if the sticky-querier-timer expires; and
a query message sending unit, configured to periodically send a sticky-query message to the network device when the sticky-query-timer expires.

A network system in which a router is elected to be a querier according to a preset condition, includes:

a querier, configured to: start a sticky-querier-timer; enter the sticky-querier state if the sticky-querier-timer expires; and start a sticky-query-timer, where the sticky-query-timer is configured to periodically trigger the querier to send a sticky-query message to a network device; and
the network device, configured to: start an other-querier-present-timer and record the address of the querier when receiving the sticky-query message.

The technical solution provided in embodiments of the present invention has the following benefits: after a querier is elected, a sticky-querier-timer is further set; after the sticky-querier-timer expires, a sticky-query-timer is started to periodically trigger the querier to send a sticky-query message to the network device; when the network device receive the sticky-query message, an other-querier-present-timer is directly started without comparing the addresses of the messages. Thus, the stability of the sticky-querier is maintained, and the network stability is guaranteed.

BRIEF DESCRIPTION OF THE DRAWINGS

To make the technical solution under the present invention clearer, the accompanying drawings for illustrating the embodiments of the present invention or the prior art are outlined below. Evidently, the accompanying drawings are exemplary only, and those skilled in the art can derive other drawings from such accompanying drawings without any creative effort.

DETAILED DESCRIPTION OF THE EMBODIMENTS

The technical solution under the present invention is detailed below with reference to the accompanying drawings. Apparently, the embodiments described below are exemplary only, without covering all embodiments of the present invention. Persons having ordinary skill in the art can derive other embodiments from the embodiments given herein without making any creative effort, and all such embodiments are covered in the scope of the present invention.

Embodiments of the present invention provide a querier election method, a router, and a network system.

For better description, the querier mentioned in the prior art is defined as a common querier in embodiments of the present invention. The sticky-querier has the functions of the common querier. However, the sticky-querier sends a sticky-query message to a network device (one or more network devices on the network); after receiving the sticky-query message, the network device may neither compare its own address with the source address of the sticky-query message nor elect a sticky-querier each time when receiving the sticky-query message, thus ensuring the relative stability of the querier on the network and the relative stability of the network. In addition, once the sticky-querier is elected, the sticky-querier may replace the querier and may not be replaced by a newly added querier, thus ensuring the relative stability of the querier on the network and the relative stability of the network.

The sticky-query message sent by the sticky-querier has the function of a common query message but the type of the sticky-query message is different from the type of the common query message. After receiving the sticky-query message, the network device may neither compare their own addresses with the address of the sticky-query message nor elect a sticky-querier. Thus, the relative stability of the network is maintained. In addition, a sticky-querier-timer and a sticky-query-timer are provided in embodiments of the present invention. The time specified by the sticky-querier-timer is equal to the time when the querier becomes the sticky-querier. The time specified by the sticky-query-timer is equal to the period in which the sticky-querier sends a sticky-query message.

Embodiment 1

Figure 1A:
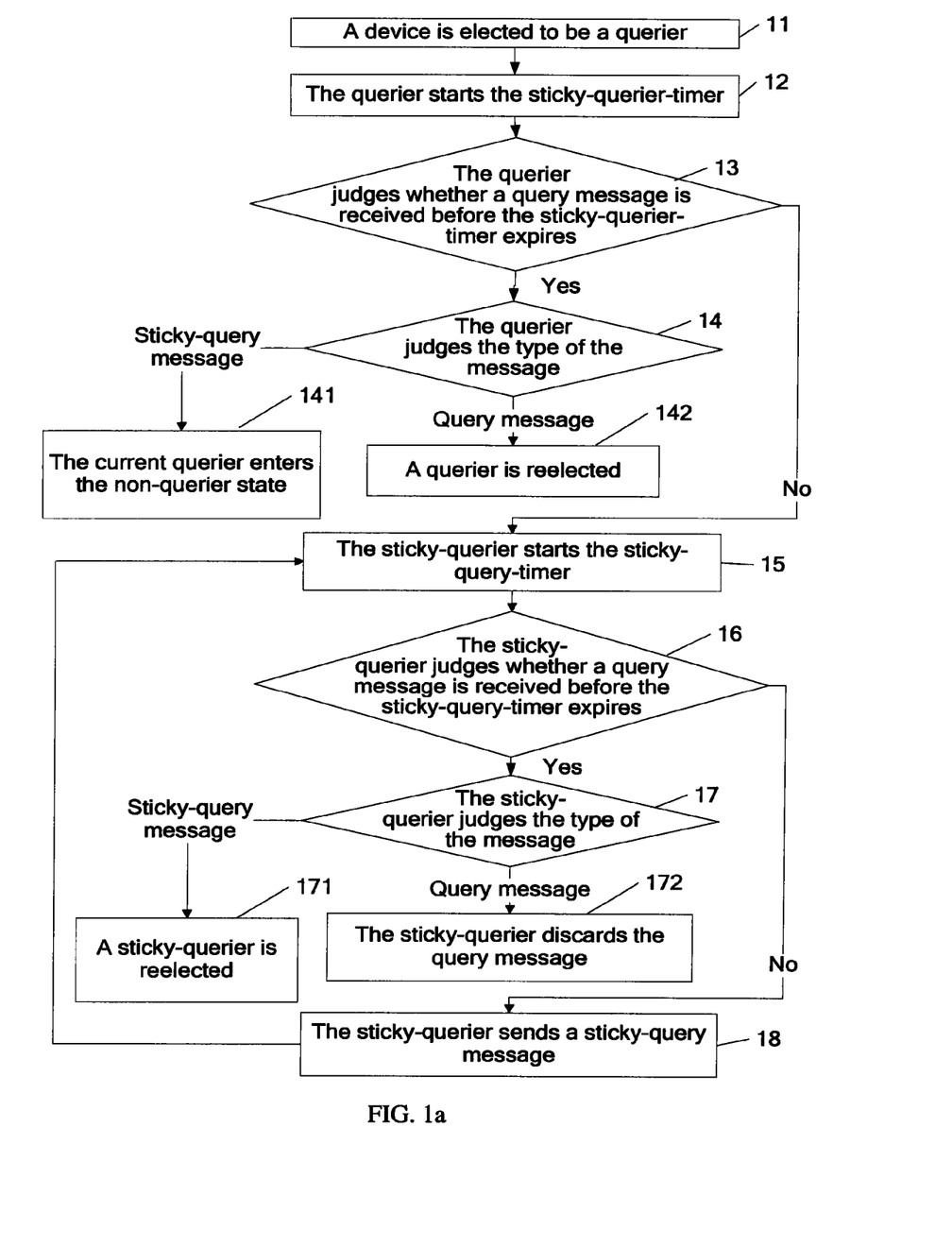
FIG. 1a is a flowchart of a querier election method in an embodiment of the present invention.

FIG. 1a is a flowchart of a querier election method in Embodiment 1 of the present invention. The querier election method includes the following steps:

Step 11: A device is elected to be a querier.

A querier is elected among the current devices. An interface of the device may act as the querier, which is configured to: send a query message, forward data traffic, or modify the forwarding rule. In this step, the current devices are all the devices on the network when the network is formed.

Step 12: The querier starts the sticky-querier-timer.

After the querier is elected, the current device elected to be the querier starts the sticky-querier-timer. The time specified by the sticky-querier-timer is equal to the time when the querier becomes the sticky-querier.

Step 13: The querier judges whether a query message is received before the sticky-querier-timer expires.

If the querier does not receive a query message before the sticky-querier-timer expires, the querier deletes the sticky-querier-timer when the sticky-querier-timer expires, and the querier changes from the querier state to the sticky-querier state, that is, the querier becomes the sticky-querier. Then, the process proceeds to step 15. If the querier receives a query message before the sticky-querier-timer expires, the querier judges the type of the message and the process proceeds to step 14.

Step 14: The querier judges the type of the message.

If the querier receives a sticky-query message (the message sent from a sticky-querier) when the sticky-querier-timer does not expire, it indicates that a sticky-querier already exists on the current network, and the current querier enters the non-querier state. Then, the process proceeds to step 141. If the querier receives a query message (the message sent from a querier) when the sticky-querier-timer does not expire, the process proceeds to step 142.

Step 141: The current querier enters the non-querier state, starts the other-querier-present-timer, and records the address of the sticky-querier that sends the sticky-query message.

Starting the other-querier-present-timer indicates there are other sticky-queriers on the network, and the current querier enters the non-querier state. The period of the other-querier-present-timer is set to be the same as the period of the sticky-query-timer. When the other-querier-present-timer expires, the querier deletes the currently recorded address of the sticky-querier.

Step 142: A querier is reelected.

The querier receiving the query message participates in election of a querier with the querier sending the query message. The election rule is as follows: the addresses of the queriers are compared, and the querier with a lower address wins the election. Specifically, the address of the querier sending the query message is compared with the address of the current querier; only the querier with a lower address exists on the network, and the querier with a higher address enters the non-querier state.

Step 15: The sticky-querier starts the sticky-query-timer.

After a device is determined as the sticky-querier, the sticky-querier starts the sticky-query-timer. The time specified by the sticky-query-timer is equal to the period in which the sticky-querier sends a sticky-query message. The sticky-query-timer may be a cyclic timer, and can be reset upon expiration to start a new round of timing.

Step 16: The sticky-querier judges whether a query message is received before the sticky-query-timer expires.

If the sticky-querier receives a query message before the sticky-query-timer expires, the sticky-querier judges the type of the message, and the process proceeds to step 17. If the sticky-querier does not receive a query message before the sticky-query-timer expires, the sticky-querier sends a sticky-query message, and the process proceeds to step 18.

Step 17: The sticky-querier judges the type of the message.

If the sticky-querier receives a sticky-query message when the sticky-query-timer does not expire, it indicates that other sticky-queriers exist on the network, and the process proceeds to step 171. If the sticky-querier receives a query message when the sticky-query-timer does not expire, it indicates that a querier also exists on the network, and the process proceeds to step 172.

Step 171: A sticky-querier is reelected.

The sticky-querier receiving the sticky-query message participates in election of a sticky-querier with the sticky-querier sending the sticky-query message. The election rule is as follows: the addresses of the sticky-queriers are compared; and the sticky-querier with a lower address wins the election. Specifically, the address of the sticky-querier sending the sticky-query message is compared with the address of the current sticky-querier; only the sticky-querier with a lower address exists on the network; and the sticky-querier with a higher address enters the non-querier state.

Step 172: The sticky-querier discards the received query message, or sends a sticky-query message to the querier sending the query message.

Step 18: The sticky-querier sends a sticky-query message to the devices on the network when the sticky-query-timer expires.

The devices on the network may be in various states, for example, the non-querier state, querier state, or sticky-querier state.

Figure 1B:
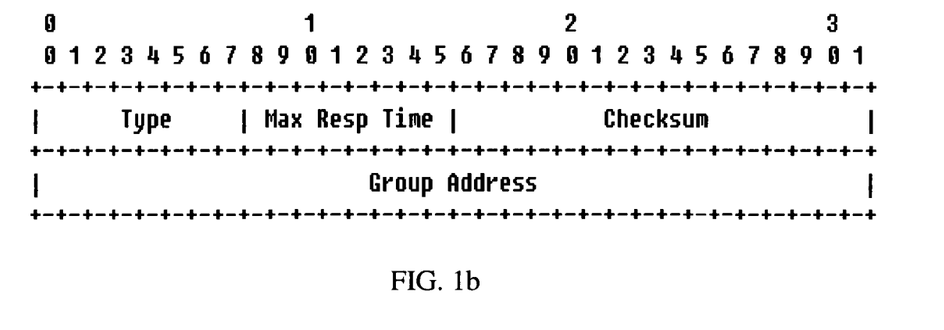
FIG. 1b is a schematic diagram illustrating a format of a sticky-query message in an embodiment of the present invention.

In this embodiment, the format of the query message is defined in the prior art, and is not further described herein. The format of the sticky-query message may be customized. For example, FIG. 1b illustrates a format of a sticky-query message. The message in FIG. 1b uses the format of the IGMP query message, including Type, Max Response Time, Checksum, and Group Address, where the Type field defines an idle type; for example, the 0xEE is used to identify the sticky-query message.

A unique sticky-querier is elected on the network. During the network planning, the network planner generally sets a device as a standby sticky-querier to ensure the network stability. When the sticky-querier is faulty, the standby sticky-querier acts as the sticky-querier. When the standby sticky-querier does not become the sticky-querier, the standby sticky-querier, being a device in the non-querier state on the network, starts the other-querier-present-timer to establish a fast detection connection with the current sticky-querier. The standby sticky-querier establishes a fast detection connection with the sticky-querier, so that the standby sticky-querier can find the faults of the sticky-querier quickly and change from the non-querier state to the querier state within a short time, thus replacing the original sticky-querier and ensuring the network stability in the case of a sticky-querier fault. In this embodiment, the connection established through a bi-directional fast detection session (BFD session) or over the Ethernet Operation, Administration, and Maintenance (OAM) protocol may be set according to the actual condition, and is not further described.

If there is no sticky-querier on the network at the beginning and the querier finds that a sticky-querier exists on the current network during the process of electing the sticky-querier, the querier does not participate in election with the current sticky-querier but enters the non-querier state. In addition, if the querier finds that a sticky-querier exists on the current network during the process of electing the sticky-querier, the querier participates in the election of the sticky-querier. In this embodiment, it is guaranteed that only a sticky-querier exists on the current network according to different conditions of the network; when there are two sticky-queriers on the current network, the sticky-queriers participate in the election; when a querier exists on the current network, the querier enters the non-querier state after receiving a sticky-query message sent from the sticky-querier; when the sticky-querier is not elected and multiple queriers exist on the network, the queriers participate in the election, thus ensuring that only one sticky-querier is elected. In this way, the relative stability of the sticky-querier is maintained, and the network stability is guaranteed.

Embodiment 2

Figure 2:
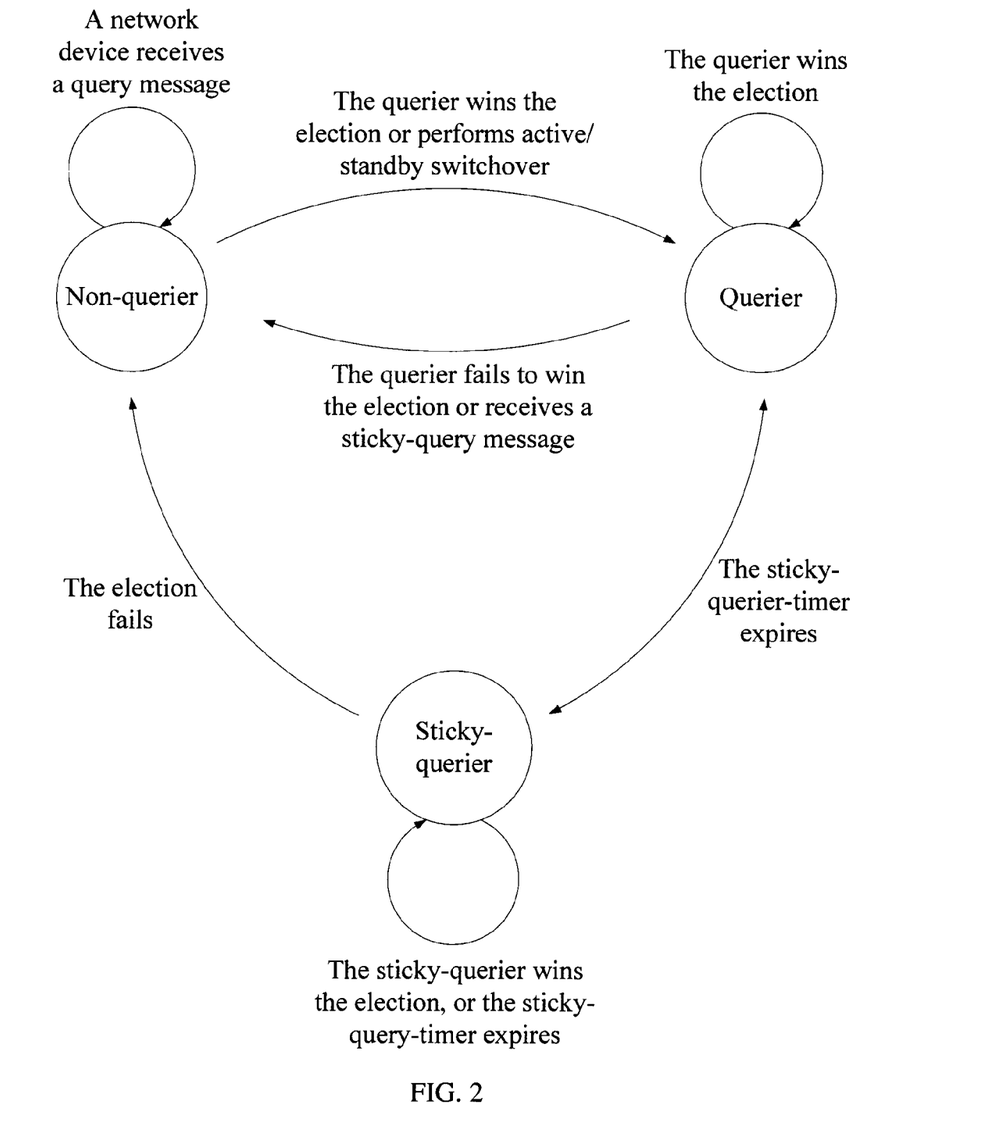
FIG. 2 illustrates the state change of a device in an election process in an embodiment of the present invention.

For better description of the state change of a device during the election process, FIG. 2 illustrates the state change of the device in Embodiment 2 of the present invention.

The states of the device on the network include the non-querier state, querier state, and sticky-querier state. In other embodiments of the present invention, the querier is a network device in the querier state, and the sticky-querier is a network device in the sticky-querier state.

The following describes the change between each state.

1. The network device in the non-querier state (hereinafter referred to as the non-querier device) starts the other-querier-present-timer. If the network device receives a query message (for example, a query message or a sticky-query message) before the other-querier-present-timer expires, the network device maintains the non-querier state.

If the non-querier device does not receive a query message before the other-querier-present-timer expires, the non-querier device participates in election with other non-querier devices, and a querier is elected according to the election rule. For example, the non-querier device with the lowest address is elected to be the querier and enters the querier state (the network device in the querier state is hereinafter referred to as the querier device); or the non-querier device, being the standby querier, determines the active/standby switchover by using a fast detection connection after the active querier takes effect or is faulty, and changes from the non-querier state to the querier state.

2. The querier device starts the sticky-querier-timer. If the querier device receives a query message before the sticky-querier-time expires, a querier is reelected according to the election rule. The reelection may be as follows: each querier device participates in election; the querier device with a lower address acts as the new querier, and other querier devices enter the non-querier state; or all the devices in each state participate in the election, and the device with the lowest address acts as a new querier; if the querier device receives a sticky-query message before the other-querier-present-timer expires, the querier device enters the non-querier state (the network device in the sticky-querier state is hereinafter referred to as the sticky-querier device).

The querier device enters the sticky-querier state after the sticky-querier-timer expires. That is, the elected querier changes from the querier state to the sticky-querier state.

3. The sticky-querier device starts the sticky-query-timer. If the sticky-querier device receives a query message before the sticky-query-time expires, the sticky-querier device discards the query message. If the sticky-querier device receives a sticky-query message before the sticky-query-timer expires, a sticky-querier is reelected. The reelection rule may be as follows: each sticky-querier device participates in reelection, and the sticky-querier device with the lowest address is elected to be the new sticky-querier device, and other sticky-querier devices enter the non-querier state.

After the sticky-query-timer expires, the sticky-querier device sends a sticky-query message to each device on the network, and resets the sticky-query-timer to start timing again.

The other-querier-present-timer exists only on the devices in the non-querier state. When the devices change from the non-querier state to other states, the devices delete the other-querier-present-timer. The sticky-querier-timer exists only on the devices in the querier state. When the devices change from the querier state to other states, the devices delete the sticky-querier-timer. The sticky-query-timer exists only on the devices in the sticky-querier state. When the devices change from the sticky-querier state to other states, the devices delete the sticky-query-timer. In addition, when the devices are in the querier state, they can also send a query message by a certain period. For example, when the transmission period of the query message is shorter than the time length of the sticky-querier-timer, the devices may send a query message once or several times before the sticky-querier-timer expires.

Embodiment 3

Figure 3:
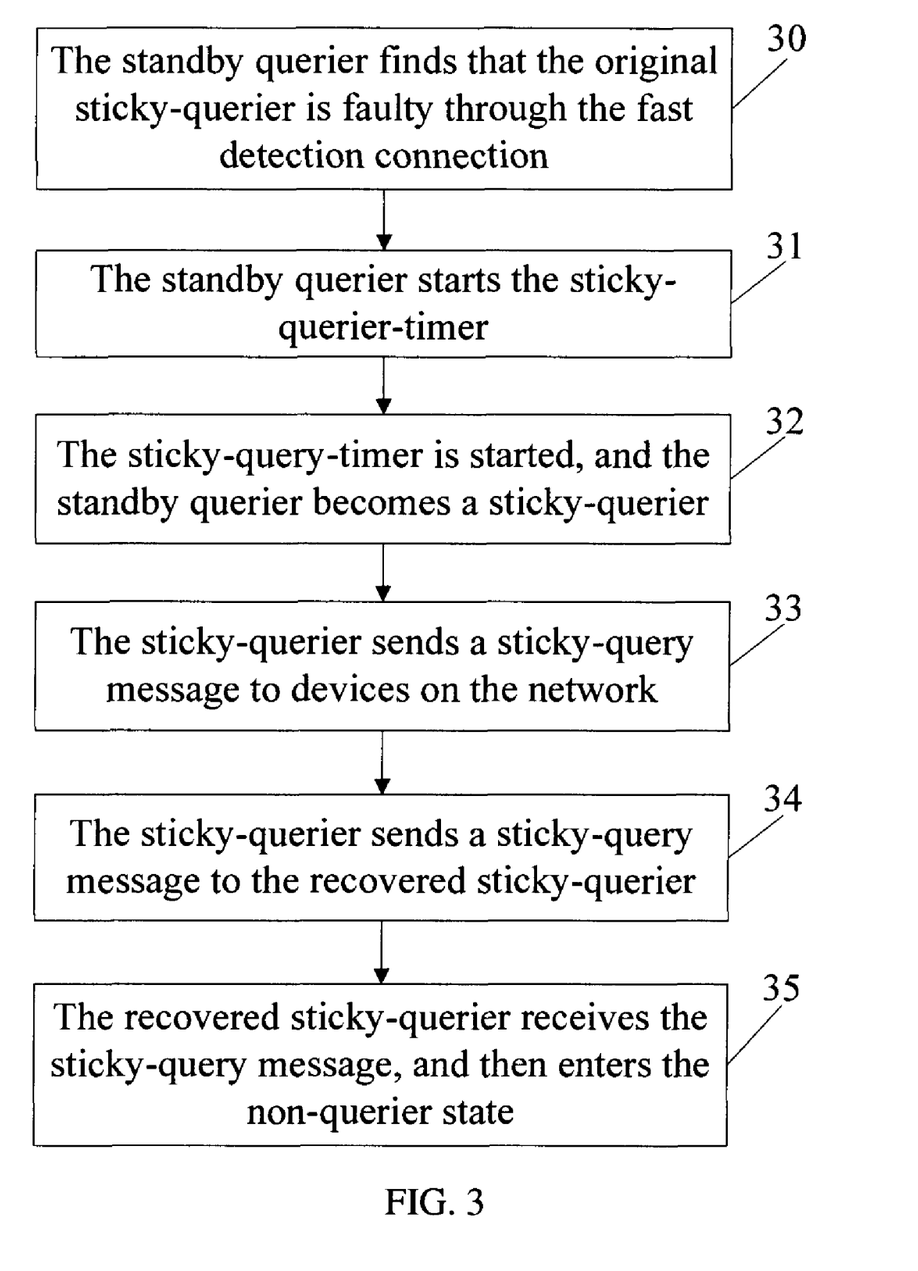
FIG. 3 illustrates a handling process performed by a standby querier when the sticky-querier is faulty.

After a sticky-querier is elected, the sticky-querier sends a sticky-query message to devices on the network. Embodiment 3 of the present invention provides a message query method according to different conditions of the network. This method describes processing modes under various conditions of the network after the sticky-querier is elected. FIG. 3 illustrates a handling process performed by a standby querier when the sticky-querier is faulty in Embodiment 3 of the present invention. The handling process includes the following steps:

Step 30: When the current sticky-querier is faulty, the standby querier finds that the current sticky-querier is faulty through the fast detection connection.

Step 31: The standby querier starts the sticky-querier-timer, and changes from the non-querier state to the querier state.

When the sticky-querier-timer expires, the standby querier deletes the sticky-querier-timer, and changes from the querier state to the sticky-querier state. Then, the process proceeds to step 32.

Step 32: The sticky-query-timer is started, and the standby querier becomes the sticky-querier.

Step 33: The sticky-querier sends a sticky-query message to the devices on the network when the sticky-query-timer expires.

Step 34: When the faulty sticky-querier is recovered, the current sticky-querier on the network finds that the faulty sticky-querier is recovered through the fast detection connection, and sends a sticky-query message to the recovered sticky-querier.

Step 35: After receiving the sticky-query message, the recovered sticky-querier enters the non-querier state. This avoids the reelection of a querier after the faulty querier is recovered, thus ensuring the network stability.

In this embodiment, after the faulty sticky-querier is recovered, the election of a querier is cancelled. Thus, the relative stability of the sticky-querier is maintained, and the network stability is guaranteed.

Embodiment 4

Figure 4:
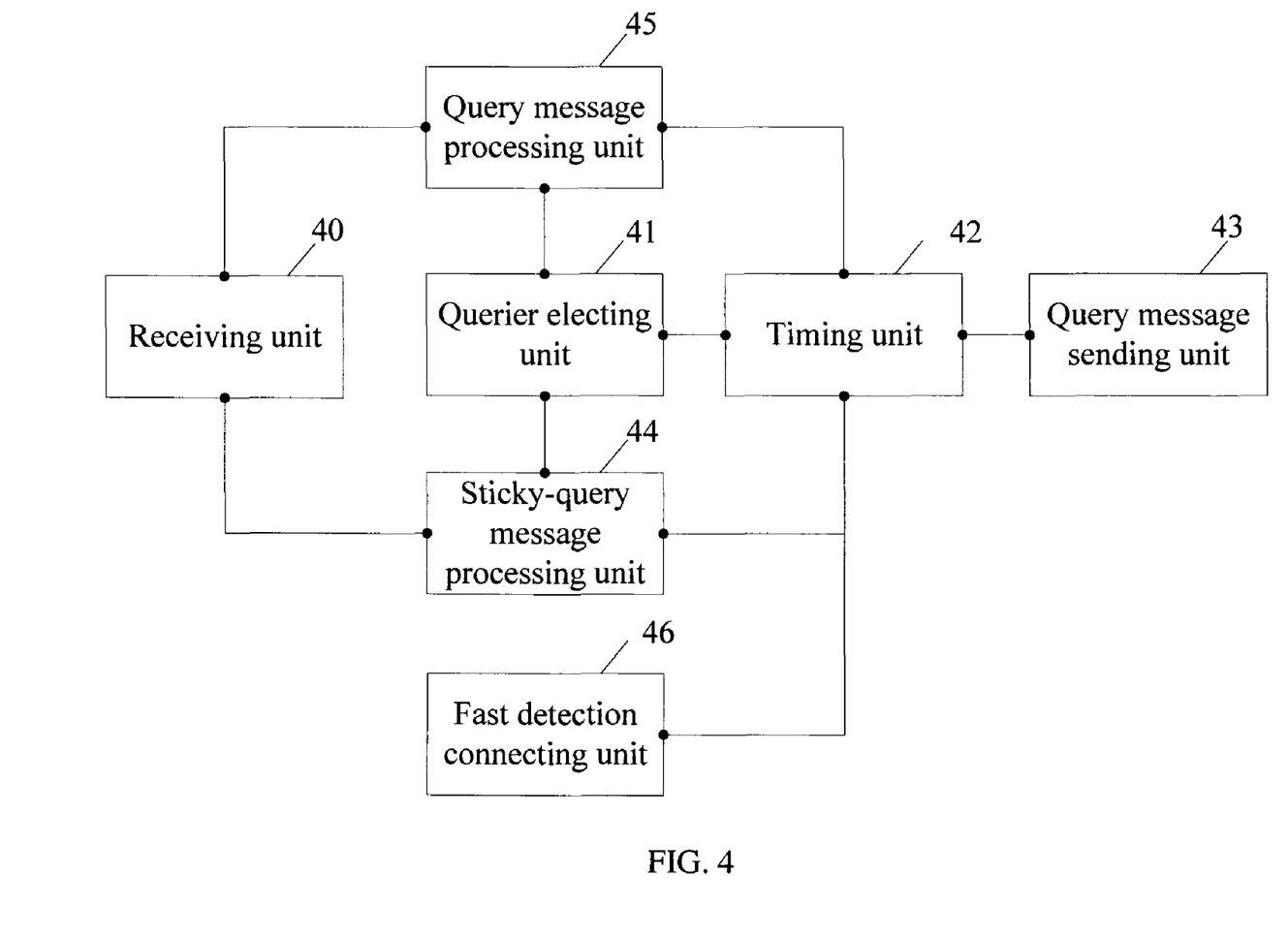
FIG. 4 shows a structure of a device in an embodiment of the present invention.

Embodiment 4 of the present invention provides a device using the preceding method. FIG. 4 shows a structure of a first device. As shown in FIG. 4, the first device includes:

a querier electing unit 41, configured to participate in election of a querier with each network device;

a timing unit 42, configured to: when the querier electing unit 41 wins the election of the querier, start the sticky-querier-timer; when the sticky-querier-timer expires, delete the sticky-querier-timer, and start the sticky-query-timer, where the first device changes from the querier state to the sticky-querier state; when the sticky-query-timer expires, reset the sticky-query-timer; and a query message sending unit 43, configured to periodically send a sticky-query message to each network device when the sticky-query-timer expires, where the sticky-query message is used to notify each network device of the timer.

The first device may further include a sticky-query message processing unit 4 configured to: process sticky-query messages received from other network devices; if the sticky-query-timer is not started, notify the timing unit 42 that the timing unit 42 needs to delete the sticky-querier-timer, start the other-querier-present-timer, and record the addresses of other network devices; or if the sticky-query-timer is already started, notify the querier electing unit 41 that the querier electing unit 41 needs to participate in election with other network devices.

The first device may further include a query message processing unit 45 configured to: process query messages received from other network devices; if the sticky-query-timer is not started, notify the querier electing unit 41 that the querier electing unit 41 needs to participate in election with other network devices; if the sticky-query-timer is already started, discard the query message.

The first device may further include a fast detection connecting unit 46 configured to establish a fast detection connection with the standby querier, where the fast detection connection is used by the standby querier to locate the fault of the first device. The fast detection connecting unit of the standby querier is configured to: establish a fast detection connection with the querier, and notify the timing unit of the standby querier that the timing unit needs to start the sticky-querier-timer when detecting faults of the querier.

In this embodiment, the first device may include all or some of the preceding units concurrently. For example, the first device includes the querier electing unit 41, the timing unit 42, the query message sending unit 43, and one or more of the sticky-query message processing unit 44, the query message processing unit 45 or the fast detection connecting unit.

The preceding first device may be a router. The router may further include a data forwarding unit configured to receive and forward data. In addition, the first device may further include a receiving unit 40 configured to receive data or messages sent from other network devices. For example, the receiving unit 40 receives a query message and sends the query message to the query message processing unit 45, receives a sticky-query message and sends the sticky-query message to the sticky-query message processing unit 44, and receives data and sends the data to the data forwarding unit. The preceding sticky-query message may adopt the format of the message in Embodiment 1.

In this embodiment, after the router is elected to be a querier, the sticky-querier-timer is started; after the sticky-querier-timer expires, the sticky-query-timer is started; the sticky-query-timer is used to periodically trigger the transmission of a sticky-query message; after other network devices receive the sticky-query message, the network devices do not participate in the election of a querier according to the sticky-query identifier in the sticky-query message. Thus, only one querier exists on the network and the querier is relatively stable, and the network stability is guaranteed.

Embodiment 5

Figure 5:
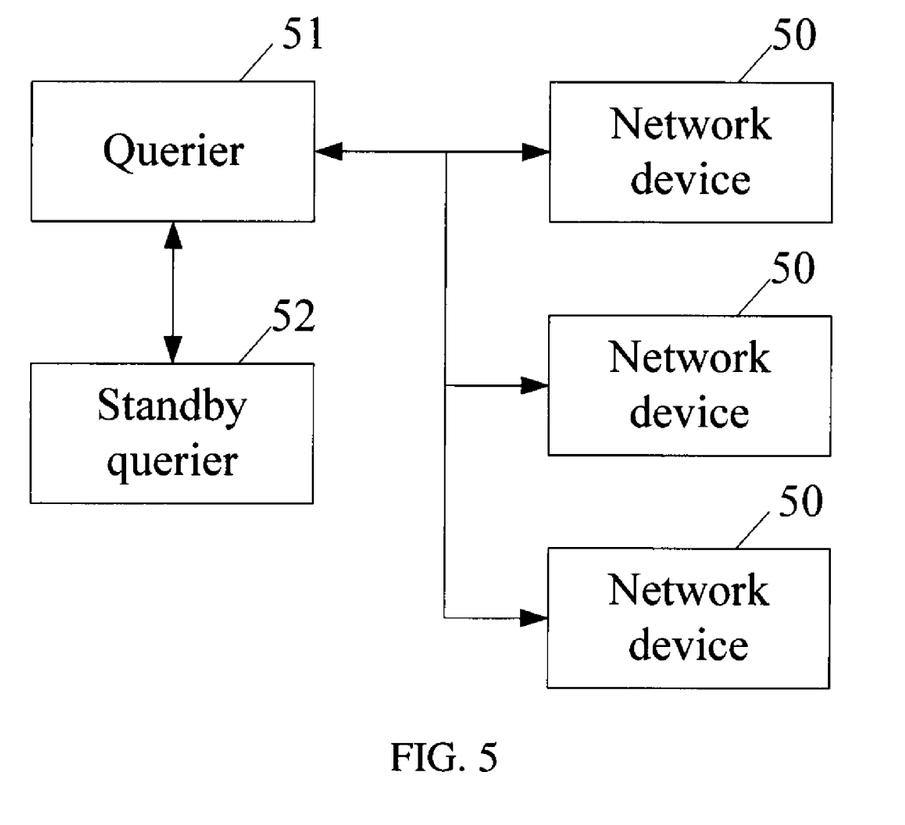
FIG. 5 shows a structure of a network system in an embodiment of the present invention.

FIG. 5 illustrates a network system in Embodiment 5 of the present invention. The network system includes multiple network devices that may include one or multiple routers. In the network system, a router is elected to be a querier 51 according to the preset condition.

The querier 51 is configured to: start the sticky-querier-timer; when the sticky-querier-time expires, delete the sticky-querier-timer, and start the sticky-query-timer. Then, the querier 51 enters the sticky-querier state. The sticky-query-timer is configured to periodically trigger the querier 51 to periodically send a sticky-query message to each network device 50.

Each network device 50 is configured to: when receiving the sticky-query message, start the other-querier-present-timer, and record the address of the querier 51.

The preceding network system may further be configured with a standby querier 52. The standby querier 52 is configured to: establish a fast detection connection with the querier 51; when the querier 51 is faulty, start the sticky-querier-timer; when the sticky-querier-timer expires, delete the sticky-querier-timer, and start the sticky-query-time. Then, the standby querier 52 enters the sticky-querier state.

In other embodiments, the preceding router elected to be a querier may be any router in Embodiment 4 of the present invention.

In this embodiment, after the router is elected to be a querier, the sticky-querier-timer is started; after the sticky-querier-timer expires, the sticky-query-timer is started; the sticky-query-timer is used to periodically trigger the transmission of the sticky-query message; after other network devices receive the sticky-query message, the network devices do not participate in the election of a querier according to the sticky-query identifier in the sticky-query message. Thus, only one querier exists on the network and the querier is relatively stable, and the network stability is guaranteed.

Detailed above are a method and device for electing a querier in embodiments of the present invention. Persons having ordinary skill in the art can make variations and modifications to the present invention in terms of specific implementations and application scopes according to the ideas of the present invention. Therefore, the specification shall not be construed as limitations to the present invention.

What is claimed is:

1. A querier election method, comprising:
   starting, by a querier, a sticky-querier-timer;
   determining, by the querier, that the sticky-querier-timer expires before receiving a query message;
   entering a sticky-querier state by the querier in response to the determination;
   starting, by the querier in the sticky-querier state, a sticky-query-timer;
   determining whether the query message is received before the sticky-query-timer expires; and
   if the sticky-query-timer expires before receiving the query message, sending, by the querier, a sticky-query message to a network device, the sticky-query message preventing the network device from comparing an address of the network device with a source address of the sticky-query message and from participating in a querier election process in response to the sticky-query message,
   wherein the querier in the sticky-querier state participates in an election with the network device by comparing an address of the querier with an address of the network device and electing one of the network device or the querier with a lower address to be a sticky-querier.

2. The method of claim 1, wherein when the querier receives a sticky-query message from the network device, the method further comprises: if the querier does not enter the sticky-querier state, starting an other-querier-present-timer, and recording an address of the network device.

3. The method of claim 1, wherein when the querier receives the query message from the network device, the method further comprises:
   if the querier does not enter the sticky-querier state, participating in an election with the network device; and
   if the querier enters the sticky-querier state, discarding the query message.

4. The method of claim 3, wherein after starting the sticky-query-timer, the method further comprises:
   setting a standby querier, wherein the standby querier is configured to start an other-querier-present-timer, and establishing, by the querier, a fast detection connection with the standby querier.

5. The method of claim 4, wherein when the querier is faulty, the standby querier deletes the other-querier-present-timer and starts the sticky-querier-timer, wherein:
   if the sticky-querier-timer expires, the standby querier deletes the sticky-querier-timer, starts the sticky-query-timer, and enters the sticky-querier state.

6. The method of claim 1, wherein the sticky-query message comprises a sticky-query identifier for preventing a receiver from participating in the querier election.

7. A router, comprising:
   a memory; and
   a processor configured to:
   start a sticky-querier-timer;
   determine the sticky-querier-timer expires before a query message is received;
   causing the router to enter a sticky-querier state in response to the determination;
   start a sticky-query-timer when the router is in the sticky-querier state; and
   determine whether the query message is received before the sticky-query-timer expires;
   if the sticky-query-timer expires before receiving the query message, send a sticky-query message to a network device, the sticky-query message preventing the network device from comparing an address of the network device with a source address of the sticky-query message and from participating in a querier election process in response to the sticky-query message,
   wherein the router in the sticky-querier state participates in an election with the network device by comparing an address of the router with an address of the network device and electing one of the network device or the router with a lower address to be a sticky-querier.

8. The router of claim 7,
   wherein the processor is configured to:
   when receiving a sticky-query message from the network device, start an other-querier-present-timer and record an address of the network device if the router does not enter the sticky-querier state.

9. The router of claim 8,
   wherein the processor is further configured to:
   when receiving a query message from the network device, participate in the election with the network device if the router does not enter the sticky-querier state; and discard the query message if the router enters the sticky-querier state.

10. The router of claim 7,
    wherein the processor is further configured to establish a fast detection connection with a standby querier, wherein the fast detection connection is used by the standby querier to determine faults of the router.

11. A network system, comprising:
    a querier, configured to:
    start a sticky-querier-timer;
    determine, by the querier, that the sticky-querier-timer expires before receiving a query message;
    enter a sticky-querier state in response to the determination;
    start a sticky-query-timer;
    determine whether the query message is received before the sticky-query-timer expires; and
    if the sticky-query-timer expires before receiving the query message, send a sticky-query message to a network device, the sticky-query message preventing the network device from comparing an address of the network device with a source address of the sticky-query message and from participating in a querier election process in response to the sticky-query message,
    wherein the querier in the sticky-querier state participates in an election with the network device by comparing an address of the querier with an address of the network device and electing one of the network device or the querier with a lower address to be a sticky-querier; and
    the network device, configured to: when receiving the sticky-query message, start an other-querier-present-timer, and record an address of the querier.

12. The network system of claim 11, further comprising:
    a standby querier, configured to: establish a fast detection connection with the querier, start the sticky-querier-timer when the querier is faulty, and start the sticky-query-timer when the sticky-querier-timer expires.

13. The network system of claim 11, wherein the querier is further configured to:
    receive a sticky-query message from the network device;
    if the querier does not enter the sticky-querier state, start the other-querier-present-timer, and record an address of the network device; or participate in an election with the network device if the querier enters the sticky-querier state.

* * * * *